US006413487B1

(12) United States Patent
Resasco et al.

(10) Patent No.: US 6,413,487 B1
(45) Date of Patent: Jul. 2, 2002

(54) METHOD AND APPARATUS FOR PRODUCING CARBON NANOTUBES

(75) Inventors: Daniel E. Resasco; Boonyarach Kitiyanan; Walter Alvarez; Leandro Balzano, all of Norman, OK (US)

(73) Assignee: The Board of Regents of the University of Oklahoma

(*) Notice: Subject to any disclaimer, the term of this patent is extended or adjusted under 35 U.S.C. 154(b) by 47 days.

(21) Appl. No.: 09/587,257

(22) Filed: Jun. 2, 2000

(51) Int. Cl.[7] .................................................. D01F 9/12
(52) U.S. Cl. .............................. 423/447.3; 427/249.1
(58) Field of Search ........................ 423/447.3, 249.1

(56) References Cited

U.S. PATENT DOCUMENTS

| | | | |
|---|---|---|---|
| 4,663,230 A | 5/1987 | Tennent | 428/367 |
| 5,165,909 A | 11/1992 | Tennent et al. | 423/447 |
| 5,227,038 A | 7/1993 | Smalley et al. | 204/173 |
| 5,300,203 A | 4/1994 | Smalley | 204/157.41 |
| 5,482,601 A | 1/1996 | Ohshima et al. | 204/173 |
| 5,543,378 A | 8/1996 | Wang | 502/174 |
| 5,556,517 A | 9/1996 | Smalley | 204/157.41 |
| 5,560,898 A | 10/1996 | Uchida | 423/461 |
| 5,578,543 A | 11/1996 | Tennent et al. | 502/180 |
| 5,587,141 A | 12/1996 | Ohshima et al. | 423/445 |
| 5,591,312 A | 1/1997 | Smalley | 204/157.41 |
| 5,603,907 A | 2/1997 | Grochowski | |
| 5,641,466 A | 6/1997 | Ebbesen et al. | 423/447.2 |
| 5,648,056 A | 7/1997 | Tanaka | 423/445 |
| 5,695,734 A | 12/1997 | Ikazaki et al. | 423/461 |
| 5,698,175 A | 12/1997 | Hiura et al. | 423/447.1 |
| 5,707,916 A | 1/1998 | Snyder et al. | 502/416 |
| 5,744,235 A | 4/1998 | Creehan | 428/364 |
| 5,753,088 A | 5/1998 | Olk | 204/173 |
| 5,773,834 A | 6/1998 | Yamamoto et al. | 204/192 |
| 5,780,101 A | 7/1998 | Nolan et al. | 427/216 |
| 5,814,290 A | 9/1998 | Niu et al. | 423/344 |
| 5,877,110 A | 3/1999 | Snyder et al. | 502/180 |
| 5,965,267 A | 10/1999 | Nolan et al. | 428/408 |
| 5,985,232 A | 11/1999 | Howard et al. | 423/447.3 |
| 5,997,832 A | 12/1999 | Lieber et al. | |

FOREIGN PATENT DOCUMENTS

| | | |
|---|---|---|
| WO | 9709272 | 3/1997 |
| WO | 9839250 | 9/1998 |
| WO | 9842620 | 10/1998 |
| WO | WO 00/17102 | 3/2000 |

OTHER PUBLICATIONS

Crystalline Ropes of Metallic Carbon Nanotubes, Thess et al., *Science*, vol. 273, pp. 483–487, Jul. 1996.
Large–Scale Synthesis of Aligned Carbon Nanotubes, Li et al., *Science*, vol. 274, pp. 1701–1703, Dec. 1996.
International Search Report, PCT/US00/15362. No Date.
Database Accession No. 1999–366878, Canno, "Canno KK", XP–002149235, May 25, 1999.
B. Kitiyanan et al., "Controlled production of single–wall carbon nanotubes by catalytic decomposition of CO on bimetallic Co–Mo catlaysts", Chemical Physics Letters, 317 (2000), pp. 497–503, Feb. 4, 2000.

(List continued on next page.)

*Primary Examiner*—Stuart L. Hendrickson
(74) *Attorney, Agent, or Firm*—Dunlap, Codding & Rogers, P.C.

(57) ABSTRACT

A method and apparatus for catalytic production of carbon nanotubes. Catalytic particles are exposed to different process conditions at successive stages wherein the catalytic particles do not come in contact with reactive (catalytic) gases until preferred process conditions have been attained, thereby controlling the quantity and form of carbon nanotubes produced. The method also contemplates methods and apparatus which recycle and reuse the gases and catalytic particulate materials, thereby maximizing cost efficiency, reducing wastes, reducing the need for additional raw materials, and producing the carbon nanotubes, especially SWNTs, in greater quantities and for lower costs.

23 Claims, 5 Drawing Sheets

OTHER PUBLICATIONS

V. Brotons et al., "Catalytic influence of bimetallic phases for the synthesis of single–walled carbon nanotubes", Journal of Molecular Catalysis, A: Chemical 116 (1997) 397–403.

I. Willems et al., "Control of the outer diameter of thin carbon nanotubes synthesized by catalytic decomposition of hydrocarbons", Chemical Physics Letters, 317 (2000) pp. 71–76.

Che et al., "Chemical Vapor Deposition Based Synthesis of Carbon Nanotubes and Nanofibers Using a Template Method", Chemical Mater. 1998, 10, pp. 260–267. No Month.

Chen et al., "Growth of carbon nanotubes by catalytic decompositon of CH4 or CO on a Ni–MgO catalyst", Carbon vol. 35, No. 10–11, pp. 1495–1501, 1997.

Govindaraj et al., "Carbon structures obtained by the disproportionation of carbon monoxide over nickel catalysts", Materials Research Bulletin, vol. 33, No. 4, pp. 663–667, 1998.

Hernadi et al., "Catalytic synthesis of carbon nanotubes using zeolite support", Elsevier Science Inc. 1996. No Month.

Fonseca et al., "Synthesis of single–and multi–wall carbon nanotubes over supported catalysts", Applied Physics A, 67, pp. 11–22, 1998. No Month.

Hafner et al., "Catalytic growth of single–wall carbon nanotubes from metal particles", Chemical Physics Letters, 296, pp. 195–202, Oct. 1998.

Cassell et al., "Large Scale CVD Synthesis of Single–Walled Carbon Nanotubes", American Chemical Society, pp. 6483–6492, 1999.

Krishnankutty et al.;"The Effect of Copper on the Structural Characteristics of Carbon Filaments Produced from Iron Catalyzed Decomposition of Ethylene," *Catalysts Today*, 37:295–307, 1997. No Month.

Iijima, Sumio; "Helical Microtubules of Graphitic Carbon," *Nature*, 354:56–58, Nov. 1991.

Iijima et al.; "Single–Shell Carbon Nanotubes of 1–nm Diameter", *Nature* 363:603–605, Jun. 1993.

Bethune et al.; "Cobalt–Catalysed Growth of Carbon Nanotubes with Single–Atomic–Layer Walls," *Nature*, 363:605–607, Jun. 1993.

Dai et al.; "Single–Wall Nanotubes Produced By Metal–Catalyzed Disproportionation of Carbon Monoxide," *Chemical Physics Letters*, 260:471–475, 1996.

Ivanov et al.; "The Study of Carbon Nanotubes Produced by Catalytic Method," *Chemical Physics Letters*m 223:329–335, Jun. 1994.

Cheng et al.; "Large–Scale and Low–cost Synthesis of Single–Walled Carbon Nanotubes by the Catalytic Pyrolysis of Hydrocarbons," *Applied Physics Letters*, 72 (25) :3282–3284, Jun. 25, 1998.

Cheng et al.;"Bulk Morphology and Diameter Distribution of Single–Walled Carbon Nanotubes Synthesized by Catalytic Decomposition of Hydrocarbons," *Chemical Physics Letters*, 289:602–610, 1998.

Rinzler et al.; "Large–Scale Purification of Single–Wall Carbon Nanotubes: Process, Product, and Characterization," *Applied Physics A*, 67:29–37, 1998.

Journet et al.; "Large–Scale Production of Single–Walled Carbon Nanotubes by the Electric–Arc Technique," *Nature*, 338:756–758, Aug. 1997.

Yakobson et al.; "Fullerene Nanotubes: $C_{1,000,000}$ and Beyond," *American Scientist*, 85:324–337, Jul.–Aug. 1997.

"Unique Slough Resistant Sr™ Series ESD Thermoplastic Product Line Offers Reduced Particle Contamination For Demanding Electronic Applications," "Conductive Plastics," and "Hyperion Graphite Fibrils™", Hyperion Catalysis International Website; http://www.fibrils.com/esd.htm.

METHOD AND APPARATUS FOR PRODUCING CARBON NANOTUBES

STATEMENT REGARDING FEDERALLY SPONSORED RESEARCH OR DEVELOPMENT

This invention was supported by NSF Grant CTS-9726465. The U.S. Government has certain rights to this invention.

CROSS-REFERENCE TO RELATED APPLICATIONS

Not Applicable

BACKGROUND OF THE INVENTION

This invention is related to the field of producing carbon nanotubes, and more particularly, but not by way of limitation, to methods and apparatus for producing single-walled carbon nanotubes.

Carbon nanotubes (also referred to as carbon fibrils) are seamless tubes of graphite sheets with full fullerene caps which were first discovered as multilayer concentric tubes or multi-walled carbon nanotubes and subsequently as single-walled carbon nanotubes in the presence of transition metal catalysts. Carbon nanotubes have shown promising applications including nanoscale electronic devices, high strength materials, electron field emission, tips for scanning probe microscopy, and gas storage.

Generally, single-walled carbon nanotubes are preferred over multi-walled carbon nanotubes for use in these applications because they have fewer defects and are therefore stronger and more conductive than multi-walled carbon nanotubes of similar diameter. Defects are less likely to occur in single-walled carbon nanotubes than in multi-walled carbon nanotubes because multi-walled carbon nanotubes can survive occasional defects by forming bridges between unsaturated carbon valances, while single-walled carbon nanotubes have no neighboring walls to compensate for defects.

However, the availability of these new single-walled carbon nanotubes in quantities necessary for practical technology is still problematic. Large scale processes for the production of high quality single-walled carbon nanotubes are still needed.

Presently, there are three main approaches for synthesis of carbon nanbotubes. These include the laser ablation of carbon (Thess, A. et al., *Science*, 273:483, 1996), the electric arc discharge of graphite rod (Journet, C. et al., *Nature*, 388:756, 1997), and the chemical vapor deposition of hydrocarbons (Ivanov, V. et al., *Chem. Phys. Lett*, 223:329, 1994; Li A. et al., *Science*, 274:1701, 1996). The production of multi-walled carbon nanotubes by catalytic hydrocarbon cracking is now on a commercial scale (U.S. Pat. No. 5,578,543) while the production of single-walled carbon nanotubes is still in a gram scale by laser (Rinzier, A. G. et al., *Appl. Phys. A.*, 67:29, 1998) and arc (Journet, C. et al., *Nature*, 388:756, 1997) techniques.

Unlike the laser and arc techniques, carbon vapor deposition over transition metal catalysts tends to create multi-walled carbon nanotubes as a main product instead of single-walled carbon nanotubes. However, there has been some success in producing single-walled carbon nanotubes from the catalytic hydrocarbon cracking process. Dai et al. (Dai, H. et al., *Chem. Phys. Lett*, 260:471 1996) demonstrate web-like single-walled carbon nanotubes resulting from disproportionation of carbon monoxide (CO) with a molybdenum (Mo) catalyst supported on alumina heated to 1200° C. From the reported electron microscope images, the Mo metal obviously attaches to nanotubes at their tips. The reported diameter of single-walled carbon nanotubes generally varies from 1 nm to 5 nm and seems to be controlled by the Mo particle size. Catalysts containing iron, cobalt or nickel have been used at temperatures between 850° C. to 1200° C. to form multi-walled carbon nanotubes (U.S. Pat. No. 4,663,230). Recently, rope-like bundles of single-walled carbon nanotubes were generated from the thermal cracking of benzene with iron catalyst and sulfur additive at temperatures between 1100–1200° C. (Cheng, H. M. et al., *Appl. Phys. Lett.*, 72:3282, 1998; Cheng, H. M. et al., *Chem. Phys. Lett.*, 289:602, 1998). The synthesized single-walled carbon nanotubes are roughly aligned in bundles and woven together similarly to those obtained from laser vaporization or electric arc method. The use of laser targets comprising one or more Group VI or Group VIII transition metals to form single-walled carbon nanotubes has been proposed (WO98/39250). The use of metal catalysts comprising iron and at least one element chosen from Group V (V, Nb and Ta), VI (Cr, Mo and W), VII (Mn, Tc and Re) or the lanthanides has also been proposed (U.S. Pat. No. 5,707,916). However, methods using these catalysts have not been shown to produce quantities of nanotubes having a high ratio of single-walled carbon nanotubes to multi-walled carbon nanotubes. Moreover, metal catalysts are an expensive component of the production process.

In addition, the separation steps which precede or follow the reaction step represent a large portion of the capital and operating costs required for production of the carbon nanotubes. Therefore, the purification of single-walled carbon nanotubes from multi-walled carbon nanotubes and contaminants (i.e., amorphous and graphitic carbon) may be substantially more time consuming and expensive than the actual production of the carbon nanotubes.

Therefore, new and improved methods of producing nanotubes which enable synthesis of bulk quantities of substantially pure single-walled carbon nanotubes at reduced costs are sought. It is to such methods and apparatus for producing nanotubes that the present invention is directed.

SUMMARY OF THE INVENTION

According to the present invention, a method and apparatus for producing carbon nanotubes is provided which avoids the defects and disadvantages of the prior art. Broadly, the method includes contacting, in a reactor cell, metallic catalytic particles with an effective amount of a carbon-containing gas at a temperature sufficient to catalytically produce carbon nanotubes, wherein a substantial portion of the carbon nanotubes.

Further, the invention contemplates a method wherein the catalytic particles are exposed to different process conditions at successive stages wherein the catalytic particles do not come in contact with reactive (catalytic) gases until preferred process conditions have been attained thereby controlling the quantity and form of carbon nanotubes produced. The method also contemplates methods and apparatus which recycle and reuse the gases and catalytic particulate materials, thereby maximizing cost efficiency, reducing wastes, reducing the need for additional raw materials, and producing the carbon nanotubes, especially SWNTs, in greater quantities and for lower costs.

Other objects, features and advantages of the present invention will become apparent from the following detailed

DETAILED DESCRIPTION OF THE INVENTION

Figure 1:
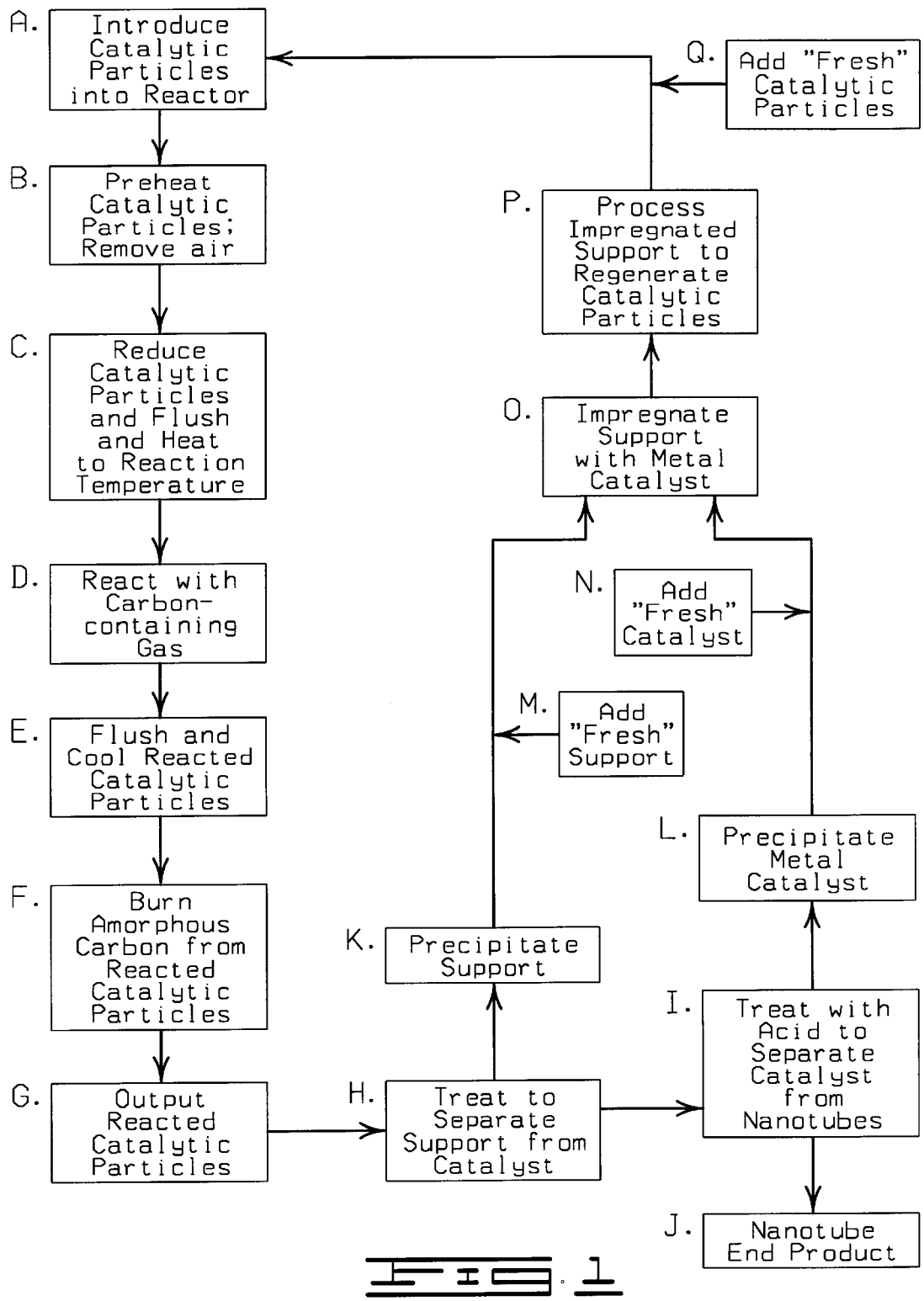
FIG. 1 is a flowchart showing the process steps of one embodiment of the present invention.

A preferred embodiment of a method contemplated by the invention described herein is characterized by the schematic flowchart shown in FIG. 1. The process shown in FIG. 1 is but one embodiment of the present invention and as such it is understood that the present invention is not limited to this example or to other examples shown herein.

FIG. 1 shows a series of process steps A–Q which represent a method of continuous catalytic production of carbon nanotubes. In Step A, a quantity of catalytic particles is introduced into a reactor, such as but not limited to, the reactor 10 described elsewhere herein in detail and shown in FIGS. 2 and 3, for example. The catalytic particles are any particles comprising a catalyst effective in forming carbon nanotubes. Especially preferred embodiments of the catalytic particles are described elsewhere herein, but it will be understood that the present invention is not to be limited only to the types of catalytic particle explicitly described herein. In any event, the catalytic particles generally comprise a solid support material which first has been impregnated with a metallic catalyst (i.e., a transition metal precursor) then calcined, then preferably processed into a pellet form. The pelletization process can be performed either before or after the support material is impregnated with the catalyst (transition metal precursor).

The present method is especially designed for the production of single-walled carbon nanotubes (SWNTs) because in the present process the reaction conditions (e.g., temperature and duration of exposure to reaction conditions) to which the catalytic particles are exposed are highly controlled at different stages. The ability to regulate temperature and reactive concentrations is important to obtain the high selectivity necessary to produce SWNTs. In the process described herein, these problems have been solved by subdividing the process and the reactor in which the process steps occur, into different stages so the catalytic particles are not contacted with the reactive gas (e.g., CO) until the optimal reaction conditions have been achieved. For example, the yield of nanotubes is affected by the catalyst formulation (e.g., transition metal ratio, type of support, and metal loading), by the operating parameters (e.g., reaction temperature, catalytic gas pressure, space velocity and reaction time), and by pretreatment conditions (e.g., reduction and calcination).

After the catalytic particles have been introduced into the reactor, Step B is carried out in which the catalytic particles are treated with a heated inert gas, e.g., He, under high pressure, which functions both to preheat the catalytic particles to a high temperature, for example, 700° C., and to remove air from the catalytic particles in preparation for the subsequent reduction step. In Step C, the catalytic particles are exposed to a reducing gas such as $H_2$ at 500° C., under high pressure, for example, which reduces, at least partially, the catalyst within the catalytic particles to prepare it for catalysis and the reducing gas is flushed from the catalytic particles by an inert gas such as He heated to 750° C., under high pressure, for example, which also reheats the catalytic particles for the next step. Where used herein, the term "high pressure" or "elevated pressure" is intended to generally represent a range of from about 1 atm to about 40 atm, where 6 atm is preferred. Other elevated pressure levels may be used in other versions of the invention contemplated herein.

Step: D follows Step C and is the reaction step in which an effective amount of a carbon-containing gas such as CO heated to a suitable reaction temperature such as 750° C. and under high pressure is exposed to the reduced catalytic particles. It is during this stage that carbon nanotubes and amorphous carbon are formed on the catalytic particles. Note that before the catalytic particles have been exposed to the carbon-containing gas, the reducing gas, e.g., $H_2$, has been flushed from the flow of catalytic particles by the reheating gas, e.g., an inert gas such as He under high pressure.

After Step D, the catalytic particles are subjected to a Step E in which the reacted catalytic particles are exposed to a heated post reaction gas under high pressure such as He heated, for example, to 750° C. which functions to flush the carbon-containing gas remaining from the previous Step D, then the flushed catalytic particles are cooled with a cooling gas such as He or other inert gas under high pressure at a lower temperature, for example, 300° C. or lower. After the reacted catalytic particles have been cooled, they are subjected to a Step F wherein they are exposed to a stream of a heated oxidative gas such as $O_2$ under high pressure, for example at 300° C., wherein the amorphous carbon particles are burned away from the catalytic particles substantially leaving only carbon nanotubes in the catalytic particles. In Step G, the oxidized catalytic particles are then removed from the reactor for further processing. In Step H, the catalytic particles are subjected to a purification process which results in the separation of the catalyst (which bears the nanotubes) from the support. In a preferred method, the support, such as $SiO_2$ is dissolved by treatment with a base such as NaOH, for example, at a concentration of 0.1–1.0 Molar, at a preferred temperature of from about 22° C. to about 70° C. with vigorous stirring or sonication or in any appropriate method known to those of ordinary skill in the art. Alternatively, the support may be soluble in an acid rather than a base, for example, a MgO support, alumina support, or $ZrO_2$ support, using HCl HF, $HNO_3$, aqua regia, or a sulfo-chromic mixture. Other support materials may require other methods of separation from the catalyst. e.g., using organic solvents such as chloro-compounds, and are also considered to be encompassed by the bounds of the present invention. For example, in an alternative embodiment organic solvents can be used to separate the carbon nanotubes from silica support by extraction after sonication using methods known in the art.

The term "catalyst" where used herein may also be used interchangeably with any of the terms "catalyst material," "metallic catalyst," "metal catalyst," "transition metal" and "transition metal precursor." The term "support" may be used interchangeably with the term "support material" or "support component."

After the support has been separated from the catalyst, the catalyst is further treated in Step I by exposure to strong acid (e.g., 0.1 M to 9 M) thereby causing dissolution of the catalyst and separation from the nanotubes thereby yielding a purified form of the carbon nanotubes in Step J. The carbon nanotubes can then be further processed to yield carbon nanotubes having a greater purity.

A key aspect of the present invention is to recycle and reuse the support material and catalyst material to improve the economy of the nanotube production process. Reuse of the metal catalyst is important because the metal catalyst is one of the most expensive components of the entire process. The support is recovered in Step K by precipitation from solution obtained during Step H wherein the base (or acid) is neutralized. "Fresh" support can be added in Step M to the support precipitated in Step K to make up for support material lost during the process. Similarly, the metal catalyst is recovered in Step L by precipitation from solution which the acid (or other dissolution solution) is neutralized. "Fresh" catalyst can be added in Step N to catalyst recovered in Step L to make up for catalyst material lost during the previous steps of the process. The precipitated support and catalyst materials, and fresh support and catalyst materials are combined in a Step O wherein the support material and catalyst are treated using methods well known to those of ordinary skill in the art to cause the support material to be impregnated with the catalyst. The impregnated support is then calcined and pelletized in a Step P, again, using methods well known in the art, to form the catalytic particles to be fed into the reactor. If desired, in a Step Q, additional "fresh" catalytic particles can be added at this stage and combined with the catalytic particles from step P, which together are then fed into the reactor, thereby completing the process of the present invention. The Steps O and P can be modified in any manner which is effective in regenerating the catalytic particles for use in the reactor.

Benefits and advantages of the carbon nanotube production method contemplated herein are numerous. The method as contemplated herein can be adjusted to maximize the production of SWNTs due to the fact that the process conditions and parameters can be highly controlled. The process is economical because the process is continuous (although it may be processed in a "batch") and because materials and gases used in the process are recovered and recycled. Recycling reduces the amount of waste product as well as the amount of raw materials initially required thereby reducing the overall cost of the process. The process results in the catalytic particles being exposed to each gaseous phase for a minimum duration thereby maintaining a more constant reactant concentration (e.g., minimizing $CO_2$ buildup) which is favorable for obtaining a homogenous nanotube product. The process contemplated herein further enables use of high gas flow rates thereby minimizing the external diffusional effects and maximizing the heat transfer rate. As noted earlier, the solid phase (catalytic particles) retention time can be adjusted independent of the gas phases. This enables the process and apparatus contemplated herein to be used with a wide range of catalysts with different activities. Further, the process is independent of the reaction yield, and the division into separate stages and steps allows different, thermal treatments to be used. These factors enable optimization of the gas hour space velocity. Additionally, as noted, initial purification of the product can be done within the reactor (the oxidation or "combustion" step).

Effects of Operating Conditions on the Reaction Yield

The SWNTs are obtained through the following exemplary exothermic and reversible reacion:

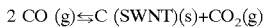

Under the reaction conditions, the Co:Mo catalyst deactivates due to different phenomena:

the formation of the SWNTs themselves;

the formation of other carbon species;

the reduction of the Co (or other catalyst) by the CO (or other carbon-containing gas).

Since the reaction and the deactivation occur at the same time, in order to maximize the yield of the reaction, it is important to find the conditions under which the formation of the SWNTs is much faster than the deactivation of the catalyst. Many of those conditions are determined by the fact that this reaction is exothermic and reversible.

Although high temperatures (above 650° C.) are necessary in order to produce SWNT with high selectivity, if the temperature is too high, (e.g., above 850° C.), the inverse reaction of the nanotube formation increases and the overall reaction rate is lower (the equilibrium of the reaction shifts to the left).

$Keq(600° C.)=0.57\ psi^{-1}$ $Keq(700° C.)=0.047\ psi^{-1}$ $Keq(800° C.)=0.0062\ psi^{-1}$ It is important to note that if the inverse reaction is avoided (e.g., by maintaining a low $CO_2$ concentration), according to the Arrhenius Law, the higher the temperature, the higher the reaction rate. The upper limit for the temperature will be given in this case by the deactivation of the catalyst due to sintering.

Since the moles number in the gaseous phase is higher in the left term of the equation than in the right term, as pressure increases, overall reaction rate of SWNT production increases and the equilibrium of the reactions shifts to the right. For instance, if the reaction is carried out isothermically starting with pure CO at 700° C., the conversion of the CO at the equilibrium shifts from 48% to 75% when the pressure is increased from 14.7 to 150 psi.

The $CO_2$ produced during the reaction also plays a very important role. The $CO_2$ not only dilutes the CO (or other reactive gas) but it also increases the importance of the inverse reaction. Both phenomena conduct to a lower reaction rate and they can even inhibit the reaction completely if the equilibrium conditions are reached. As mentioned above, the effects of $CO_2$ are exacerbated with higher temperature and lower pressure. At 800° C. and 14.7 psi, a $CO_2$/reactive gas ratio is low as 0.083 is enough to inhibit the reaction if there is no other gas present. Since the $CO_2$ is produced during the reaction, it is important to use high flow rates of the reactive gas in order to maintain a low $CO_2$/reactive gas ratio during the process.

The presence of an inert gas in the fed stream also may have undesirable effects. It not only decreases the reaction by diluting the reactive gas, but it also shifts the equilibrium of the reaction to the left, reducing the overall reaction rate even more due to the effect of the inverse reaction.

Therefore, especially preferred operating conditions are a high reactive gas concentration, a temperature in the range of 650–850° C., high pressure (above 70 psi), and a high space velocity (above 30,000 $h^{-1}$).

In general, the method for producing single-walled carbon nanotubes comprises contacting catalytic particles with an effective amount of a carbon-containing gas heated to a temperature of from about 500° C. to 1200° C., preferably from about 600° C. to about 900° C., and more preferably from about 650° C. to about 850° C., more preferably from about 700° C. to 800° C., and most preferably about 750° C.

The phrase "an effective amount of a carbon-containing gas" as used herein means a gaseous carbon species present in sufficient amounts to result in deposition of carbon on the catalytic particles at elevated temperatures, such as those described herein, resulting in formation of carbon nanotubes.

As noted elsewhere herein, the catalytic particles as described herein include a catalyst preferably deposited upon a support material. The catalyst as provided and employed in the present invention is preferably bimetallic and in an especially preferred version contains at least one metal from Group VIII including Co, Ni, Ru, Rh, Pd, Ir, Pt, and at least one metal from Group VIb including Cr, W, and Mo. Specific examples of bimetallic catalysts which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Ir—Mo, Pt—Cr, Pt—W, and Pt—Mo. Especially preferred catalysts of the present invention comprise Co—Mo, Co—W, Ni—Mo and Ni—W. The catalyst may comprise more than one of the metals from each group.

A synergism exists between the at least two metal components of a bimetallic catalyst in that metallic catalytic particles containing the catalyst are much more effective catalysts for the production of single-walled carbon nanotubes than metallic catalytic particles containing either a Group VIII metal or a Group VIb metal alone as the catalyst.

The ratio of the Group VIII metal to the Group VIb metal in the metallic catalytic particles where a bimetallic catalyst is used may also affect the selective production of single-walled carbon nanotubes. The ratio of the Group VIII metal to the Group VIb metal in a bimetallic catalyst is preferably from about 1:10 to about 15:1, and more preferably about 1:5 to about 2:1. Generally, the concentration of the Group VIb metal (e.g., Mo) will exceed the concentration of the Group VIII metal (e.g., Co) in metallic catalytic particles employed for the selective production of single-walled carbon nanotubes.

The metallic catalytic particles may comprise more than one metal from each of Groups VIII and VIb. For example, the metallic catalytic particles may comprise (1) more than one Group VIII metal and a single Group VIb metal, (2) a single Group VIII metal and more than one Group VIb metal, or (3) more than one Group VIII metal and more than one Group VIb metal and in a preferred version excludes Fe.

The catalyst particles may be prepared by simply impregnating the support with the solutions containing the transition metal prescursors. The catalyst can also be formed in situ through decomposition of a precursor compound such as bis (cyclopentadienyl) cobalt or bis (cyclopentadienyl) molybdenum chloride.

The catalyst is preferably deposited on a support such as silica ($SiO_2$), MCM-41 (Mobil Crystalline Material-41), alumina ($Al_2O_3$), MgO, Mg(Al)O (aluminum-stabilized magnesium oxide), $ZrO_2$, molecular sieve zeolites, or other oxidic supports known in the art.

The metallic catalytic particle, that is, the catalyst deposited on the support, may be prepared by evaporating the metal mixtures over flat substrates such as quartz, glass, silicon, and oxidized silicon surfaces in a manner well known to persons of ordinary skill in the art.

The total amount of bimetallic catalyst deposited on the support may vary widely, but is generally in an amount of from about 1% to about 20% of the total weight of the metallic catalytic particle, and more preferably from about 3% to about 10% by weight of the metallic catalytic particle.

In an alternative version of the invention the bimetallic catalyst may not be deposited on a support, in which case the metal components comprise substantially 100% of the metallic catalytic particle.

Examples of suitable carbon-containing gases which may be used herein include aliphatic hydrocarbons, both saturated and unsaturated, such as methane, ethane, propane, butane, hexane, ethylene and propylene; carbon monoxide; oxygenated hydrocarbons such as acetone, acetylene and methanol; aromatic hydrocarbons such as toluene, benzene and naphthalene; and mixtures of the above, for example carbon monoxide and methane. Use of acetylene promotes formation of multi-walled carbon nanotubes, while CO and methane are preferred feed gases for formation of single-walled carbon nanotubes. The carbon-containing gas may optionally be mixed with a diluent gas such as helium, argon or hydrogen.

In an especially preferred embodiment of the method claimed herein, the catalytic particle formulation is a Co—Mo/silica catalyst/support, with a Co:Mo molar ratio of about 1:2. Monometallic Co catalysts or those with a higher Co:Mo ratio tend to result in low selectivity with significant production of defective multi-walled nanotubes and graphite. In the temperature range investigated, without Co, Mo is essentially inactive for nanotube production. The catalytic particles are pre-treated in hydrogen, for example, at 500° C. Without this pre-reduction step, or with pre-reduction at higher temperatures (i.e., not enough reduction or too much reduction) the catalyst is not effective and produces less SWNT. Other supports such as alumina may result in a poor Co—Mo interaction, resulting in losses of selectivity and yield.

A high space velocity (above 30,000 $h^{-1}$) is preferred to minimize the concentration of $CO_2$, a by-product of the reaction, which inhibits the conversion to nanotubes. A high CO (or other reactive gas) concentration is preferred to minimize the formation of amorphous carbon deposits, which occur at low CO (reactive gas) concentrations. The preferred temperature range is characterized in that below 650° C. the selectivity toward SWNT is low; and above 850° C., the conversion is low due to the reversibility of the reaction (exothermic) and the deactivation of the catalyst. Therefore, the optimal temperature is between 700° C.–800° C.; more preferably between 725° C. and 775° C. and most preferably around 750° C.

The production process contemplated herein has been designed in such a way to effect a rapid contact of the preferred catalyst formulation with a flow of highly concentrated CO (or other reactive gas) at around 750° C. The quality of the SWNT produced by this method may be determined by a combination of characterization techniques involving Raman Spectroscopy, Temperature Programmed Oxidation (TPO) and Electron Microscopy (TEM).

The preferred methodology therefore comprises contacting a flow of CO gas (or other reactive gas in a high concentration) over the catalytic particles at about 750° C. for 1 hour at a high space velocity (above 30,000/h) under high pressure (above 70 psi).

If the conditions indicated above are followed, a high yield of SWNT (about 20–25 grams of SWNT per 100 grams of initial catalyst loaded in the reactor) and high selectivity (>90%) is obtained.

Operation

Figure 2:
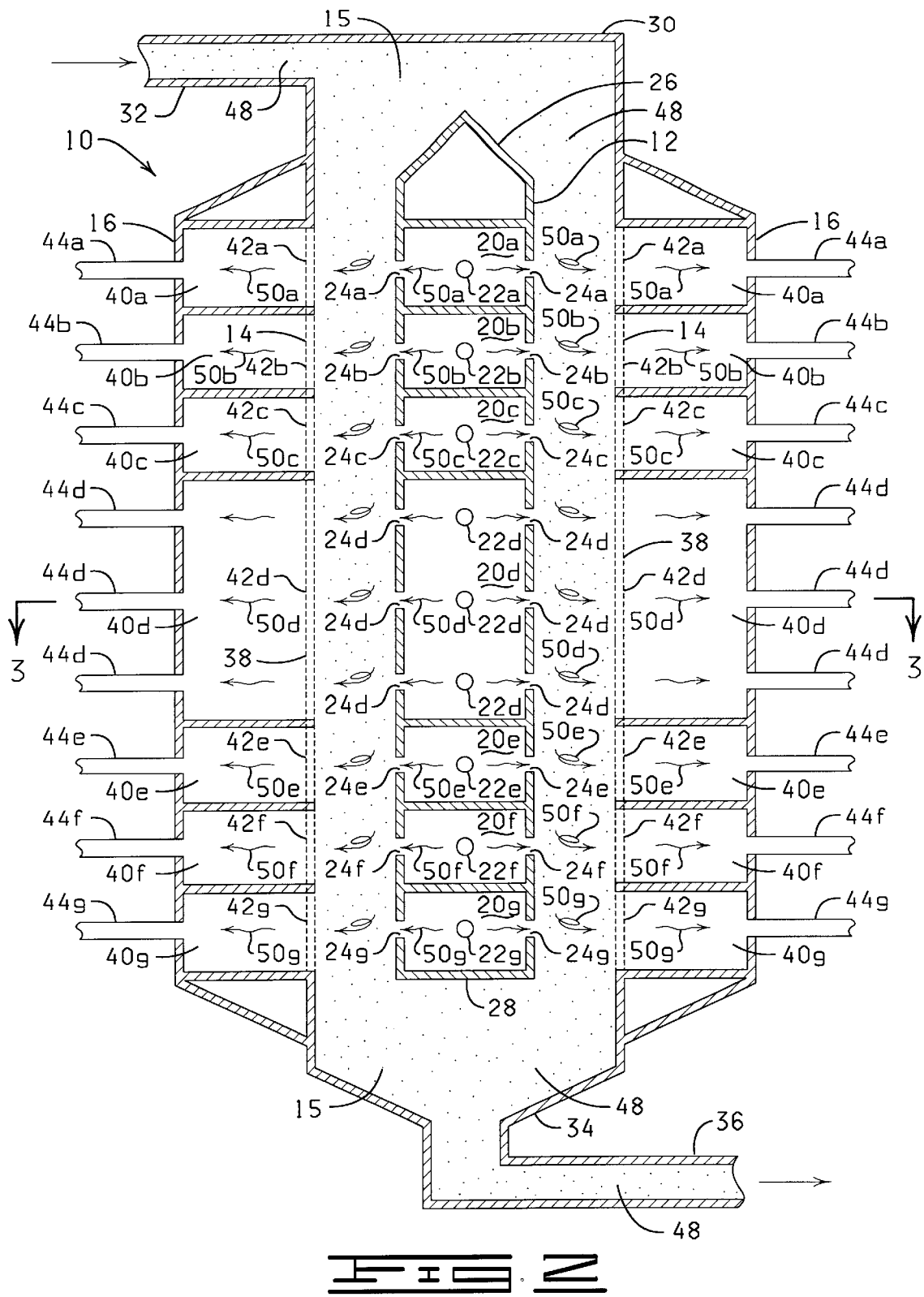
FIG. 2 is a cross-sectional view of a reactor which can be used with the process contemplated as one embodiment of the present invention.
Figure 3:
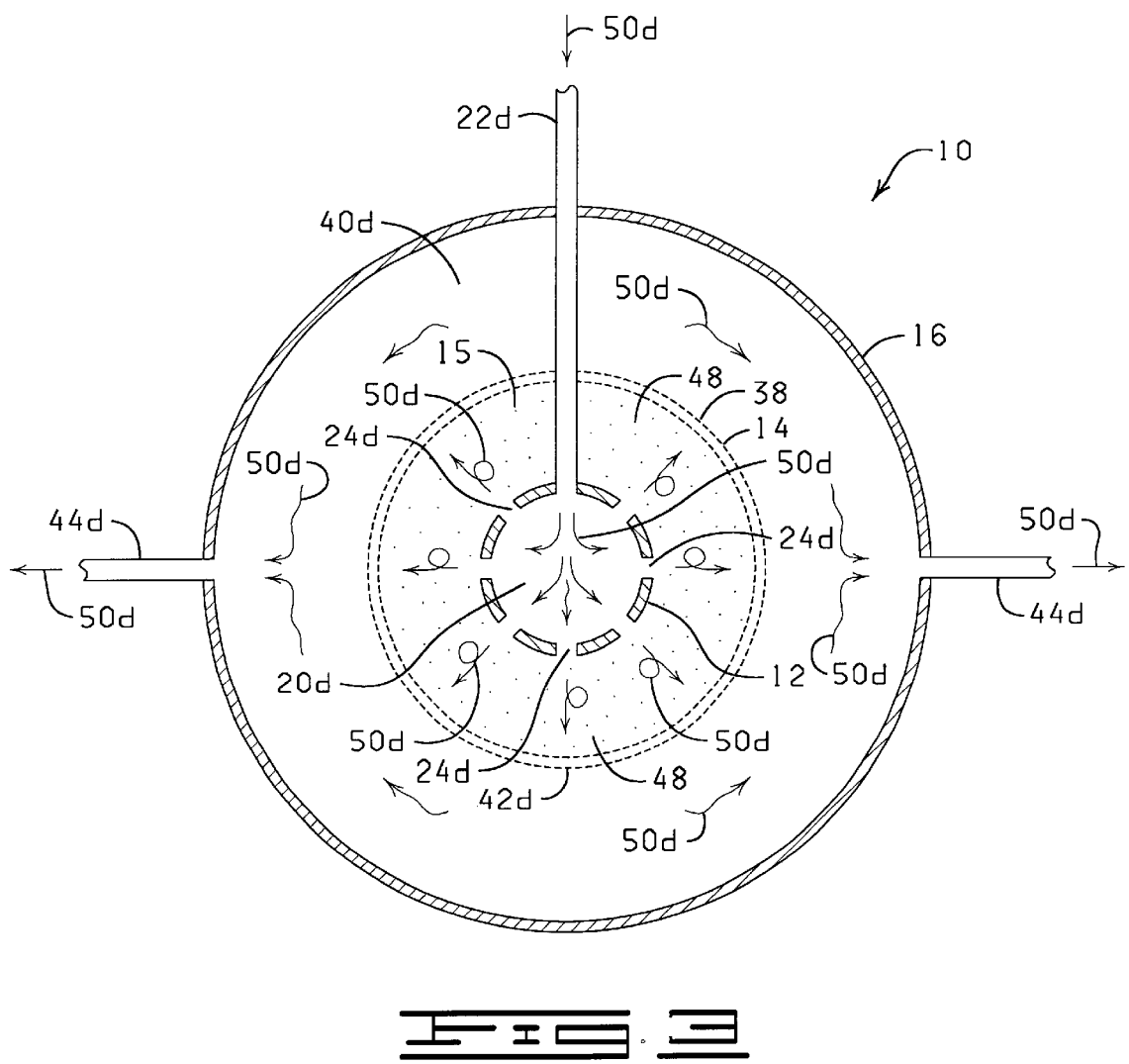
FIG. 3 is a cross-sectional view through line 3—3 of the reactor of FIG. 2.

A preferred embodiment of an apparatus for carrying out the process contemplated herein is shown in FIGS. 2 and 3. The apparatus is a reactor identified by reference numeral 10. The reactor 10 is constructed of three concentric chambers, an inner chamber 12, a middle chamber 14 having an inner space 15 (also referred to herein as a lumen) and an outer chamber 16. The inner chamber 12 is subdivided into a plurality of inlet (gas receiving) chambers including a preheating gas inlet chamber 20a, a reducing gas inlet chamber 20b, a reheating gas inlet chamber 20c, a reaction gas inlet chamber 20d, a post reaction gas inlet chamber 20e, a cooling gas inlet chamber 20f, and a combustion gas inlet chamber 20g. Each gas inlet chamber 20a–20g has at least one corresponding gas inlet, 22a–22g, respectively, and has at least one corresponding gas outlet 24a–24g, respectively. The inner chamber 12 further comprises a closed upper end 26 and a closed lower end 28.

The middle chamber 14 has an upper end 30 (also referred to herein as an input end) which has an input conduit 32 for feeding catalytic particles into the middle chamber 14, and has a lower end 34 (also referred to herein as an output end) which has an output conduit 36 for removing reacted catalytic particles from the reactor 10. The middle chamber 14 also is constructed at least partially of a porous material (including, for example, a perforated metal or screen) for forming a porous (or perforated) wall portion 38 of the middle chamber 14. The porous material may be any material which is permeable to gas introduced into the reactor 10 but which is impermeable to catalytic particles introduced into the inner space 15 contained by the middle chamber 14 and which can withstand the operating conditions of the reactor 10. Such materials are known to persons of ordinary skill in the art. The entire reactor 10 must be constructed of materials able to withstand the process condition to which they are exposed, as will be understood by a person of ordinary skill in the art.

The outer chamber 16 is constructed of a plurality of outlet (outputting chambers) chambers including a preheating gas outlet chamber 40a, a reducing gas outlet chamber 40b, a reheating gas outlet chamber 40c, a reaction gas outlet chamber 40d, a post reaction gas outlet chamber 40e, a cooling gas outlet chamber 40f, and a combustion gas outlet chamber 40g. Each gas outlet chamber 40a–40g has a porous wall portion 42a–42g, respectively, for receiving gas into each gas outlet chamber 40a–40g, and has at least one corresponding gas outlet 44a–44g, respectively, through which gas is eliminated from each corresponding outlet chamber 40a–40g, respectively.

Each gas outlet chamber 40a–40g is positioned across from each gas inlet chamber 20a–20g such that gas leaving each gas inlet chamber 20a–20g under high pressure passes across the porous wall portions 42a–42g, respectively and into each gas outlet chamber 40a–40g, respectively.

In use, a quantity of catalytic particles 48 are continuously fed into the reactor 10 through the input conduit 32, and into the inner space 15 of the middle chamber 14. An inert preheating gas 50a is introduced under high pressure through gas inlet 22a into preheating gas inlet chamber 20a and therefrom through gas outlet 24a whereby the inert preheating gas 50a, heats the catalytic particles 48 which are adjacent preheating gas inlet chamber 20a to a desired predetermined temperature. The inert preheating gas 50a then passes across the porous portion 42a into preheating gas outlet chamber 40a and out of the preheating gas outlet chamber 40a via gas outlet 44a. In a preferred embodiment, the preheating temperature is about 700° C., but in alternative embodiments the preheating, temperature can be in the range of from about 500° C. to about 1200° C.

After the catalytic particles 48 have been heated they are moved into a position adjacent reducing gas inlet chamber 20b and are reduced by a heated reducing gas 50b such as $H_2$ which is introduced under high pressure through gas inlet 22b into reducing gas inlet chamber 20b and therefrom through gas outlet 24b wherein the heated reducing gas 50b passes across the catalytic particles 48, through the porous wall portion 42b, into the reducing gas outlet chamber 40b, and out of the reducing gas outlet chamber 40b via the gas outlet 44b. In a preferred embodiment, the temperature of the heated reducing gas 50b is about 500° C., but in alternative embodiments the temperature of the heated reducing gas 50b may be in the range of from about 400° C. to about 800° C. Preferably, the heated reducing gas 50b is $H_2$, but may be $NH_3$ or, $CH_4$ in other embodiments or mixtures of these gases and other gases, for example.

After the catalytic particles 48 have been reduced by heated reducing gas 50b, they are moved into a position adjacent reheating gas inlet chamber 20c and are reheated after being cooled during reduction by an inert reheating gas 50c such as He which is introduced under high pressure through gas inlet 22c into reheating gas inlet chamber 20c and therefrom through gas outlet 24c wherein the reheating gas 50c passes across catalytic particles 48, through the porous wall portion 42c, into the reheating gas outlet chamber 40c, and out of the reheating gas outlet chamber 40c via the gas outlet 44c. In a preferred embodiment the temperature of the reheating gas 50c is about 750° C., but in alternative embodiments the temperature of the reheating gas 50c is in the range of from about 600° C. to about 1200° C. Preferably the reheating gas 50c is He, but may be Ar, or $N_2$, in other embodiments, for example, or other inert gases or mixtures thereof.

After the catalytic particles 48 have been reheated by reheating gas 50c, they are moved into a position adjacent reaction gas inlet chamber 20d and are exposed to a heated carbon-containing reaction gas 50c such as CO which is introduced under high pressure through gas inlet 22d into reaction gas inlet chamber 20d and therefrom through gas outlet 24d wherein the heated carbon-containing reaction gas 50d passes across catalytic particles 48, through the porous wall portion 42d, into the reaction gas outlet chamber 40d, and out of the reaction gas outlet chamber 40d, via the gas outlet 44d. This stage of the process is shown in detail in FIG. 3. In a preferred embodiment the temperature of the heated carbon-containing reaction gas 50d is about 750° C., but in alternative embodiments the temperature of the heated carbon-containing reaction gas 50d is in the range of from about 500° C. to about 1200° C. Preferably the heated carbon-containing reaction gas 50d is CO, but may be $CH_4$, $C_2H_4$, or $C_2H_2$ or mixtures thereof, in other embodiments for example, but may be any carbon-containing gas which functions in accordance with the present invention.

After the catalytic particles 48 have been reacted with the heated carbon-containing reaction gas 50d, they are moved into a position adjacent post reaction gas inlet chamber 20e and are flushed of the heated carbon-containing reaction gas 50d while at the reaction temperature by a heated post reaction gas 50e such as He which is introduced under high pressure through gas inlet 22e into post reaction gas inlet chamber 20e and therefrom through gas outlet 24e wherein the heated post reaction gas 50e passes across catalytic particles 48, through the porous wall portion 42e, into the post reaction gas outlet chamber 40e, and out of the post reaction gas outlet chamber 40e via the gas outlet 44e. In a preferred embodiment, the temperature of the heated post reaction gas 50e is about 750° C., i.e., the same temperature as the heated reaction gas 50d, but in alternative embodiments the temperature of the heated post reaction gas 50e is in the range of from about 300° C. to about 800° C. Preferably the post reaction gas 50e is He, but may be $N_2$ or Ar, in other embodiments for example, or any other inert gas or mixtures thereof which function in accordance with the present invention.

After the catalytic particles 48 have been cleared of the heated carbon-containing reaction gas 50d by the heated post reaction gas 50e, they are moved into a position adjacent cooling gas inlet chamber 20f and are cooled in preparation for combustion of amorphous carbon by cooling gas 50f such as He which is introduced under high pressure through gas inlet 22f into cooling gas inlet chamber 20f and therefrom through gas outlet 24f wherein the He cooling gas 50f passes across catalytic particles 48, through the porous wall portion 42f, into the cooling gas outlet chamber 40f, and out of the cooling gas outlet chamber 40f via the gas outlet 44f. In a preferred embodiment, the temperature of the cooling gas 50f is considerably lower than the temperature of the post reaction gas 50d, for example about 22° C., but in alternative embodiments the temperature of the cooling gas 50f is in the range of from about 0° C. to about 300° C. Ideally, the temperature of the cooling gas 50f is a moderate temperature sufficient to cool the catalytic particles 48 to a temperature lower than or about equal to that under which the following step will be carried out. Preferably, the cooling gas 50f is He, but may be $N_2$, or Ar, in other embodiments for example, or other inert gases or mixtures thereof.

After the catalytic particles 48 have been cooled by cooling gas 50f, they are moved into a position adjacent combustion gas inlet chamber 20g wherein the amorphous carbon residue produced during the reaction step can be burned off in a combustion (oxidation) step (without affecting the nanotubes) by a heated combustion gas 50g containing $O_2$ (e.g., 2% to 5%) which is introduced under high pressure through gas inlet 22g into combustion gas inlet chamber 20g and therefrom through gas outlet 24g wherein the heated combustion gas 50g passes across catalytic particles 48, through the porous wall portion 42g, into the combustion gas outlet chamber 40g, and out of the combustion gas outlet chamber 40g via the gas outlet 44g. In a preferred embodiment, the temperature of the heated combustion gas 50g is about 300° C., but in alternative preferred embodiments the temperature of the heated combustion gas 50g is in the range of from about 280° C. to about 320° C. Preferably the heated combustion gas 50g is $O_2$ 2–5% in a gas mixture, but may be air or an air mixture with He, in other embodiments, for example, or may be any other gas which functions in accordance with the present invention to cause oxidation of the amorphous carbon on the catalytic particles 48.

After the catalytic particles 48 have been subjected to the oxidation process to remove amorphous carbon, they are moved to the lower end 34 of the middle chamber 14 of the reactor 10 and are passed out of the reactor 10 through the output conduit 36 for further purification and processing as explained elsewhere herein.

Apparatus for inputting, driving, and outputting. the catalytic particles 48 into, through, and out of the reactor 10 are not shown but such mechanisms are well known in the art, and may include devices such as slide valves, rotary valves, table feeders, screw feeders, screw conveyors, cone valves and L valves for controlling and driving the flow of catalytic particles 48 into and out of the reactor 10. The flow rate of the catalytic particles 48 is controlled independently of gas flow in the reactor 10, and flow rates of each gas 50a–50g, in one embodiment, may not be controlled independently of one another, or in an alternate embodiment may be controlled independently thereby enabling the process conditions and parameters to be adjusted on an individual basis.

The present invention contemplates that the reactor 10, as shown and described herein, is constructed so as to enable the gases supplied to the reactor 10, such as gases 50a–50g, to be recycled after having been output from the reactor 10. For example, inert preheating gas 50a, e.g., He, is collected from gas outlet 44a, purified if necessary, mixed with additional inert preheating gas 50a to replace lost gas, reheated and pressurized, and reintroduced at gas inlet 22a. Similarly, heated reducing gas 50b, e.g., $H_2$, is collected from gas outlet 44b, purified if necessary, mixed with additional heated reducing gas 50b, reheated and pressurized, and reintroduced at gas inlet 22b. In a similar manner, reheating gas 50c, e.g., He, is collected from gas outlet 44c, purified if necessary, mixed with additional reheating gas 50c, reheated and pressurized and reintroduced at gas inlet 22c. Further, heated carbon-containing reaction gas 50d, e.g., CO, is collected from gas outlet 44d, purified if necessary, mixed with additional heated carbon-containing, reaction gas, reheated and pressurized and reintroduced at gas outlet 22d. Similarly, heated post reaction gas 50e, e.g., He, is collected from gas outlet 44e, purified if necessary, mixed with additional heated post reaction gas 50e, reheated and pressurized and reintroduced at gas inlet 22e. Cooling gas 50f, e.g., He, is collected from gas outlet 44f, purified if necessary, mixed with additional cooling gas 50f, cooled, pressurized and reintroduced at gas inlet 22f. Finally, heated combustion gas 50g, e.g., $O_2$, is collected from gas outlet 44g, purified, for example, to remove combustion products such as $CO_2$, mixed with additional heated combustion gas 50g and reheated and pressurized, and reintroduced at gas inlet 22g. Methods of mixing gases, purifying them, and reheating and repressurizing them are known to persons of ordinary skill in the art, so further discussion herein of such methods is not deemed necessary.

As noted herein, the apparatus shown in FIGS. 2 and 3 and in the portion of the present specification relating thereto describes but one type of apparatus which may be employed to carry out the method contemplated herein. Other apparatuses which may also be used are shown in FIGS. 4 and 5 and are further described below.

Figure 4:
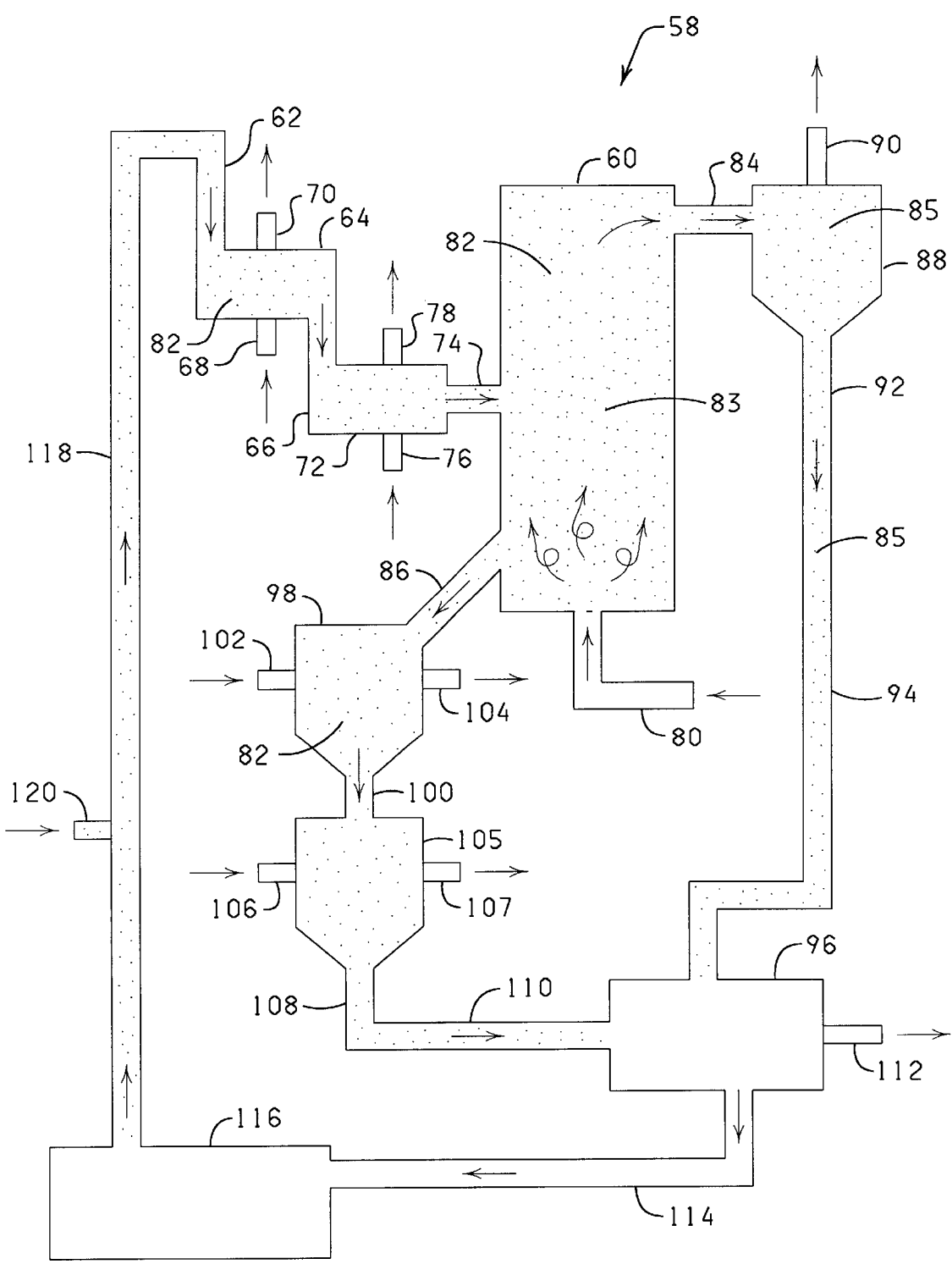
FIG. 4 is a diagrammatic representation of an apparatus which can be used in the method of the present invention.

FIG. 4 shows an apparatus 58 comprising a reactor 60 used as a component in a continuous fluidized bed process. Catalytic particles 82 are fed via an input conduit 62 into a reducing chamber 64 and are reduced in a manner similar to that discussed previously. A reducing gas such as $H_2$, can be input through gas inlet 68 and removed through gas outlet 70. After the reduction step, the catalytic particles 82 can be fed, via any appropriate mechanism, through an output channel 66 into a reheating chamber 72 wherein the catalytic particles 82 are heated to an appropriate reaction temperature via an inert heating gas such as He which is introduced into reheating chamber 72 via gas inlet 76 and which can be removed via gas outlet 78. The catalytic particles 82, after heating are passed via output channel 74 into the reactor 60 wherein they are subjected to reaction conditions by inputting a carbon-contained gas as discussed previously (e.g., CO) via a gas inlet 80 which results in the catalytic particles 82 being maintained as a "fluidized bed" 83 wherein the carbon nanotube formation process occurs. Light catalytic particles 85 may be lofted out of the fluidized bed 83 and carried out with exhaust gas through an exhaust conduit 84 into a light particle trap 88 which filters the light catalytic particles 85 from the exhaust gas which is eliminated via exhaust outlet 90. The light catalytic particles 85 are thereby recovered and passed through a trap output 92 via a light particle conduit 94 into a catalytic particle treatment unit 96 for further processing and recycling of the light catalytic particles 85. Meanwhile the catalytic particles 82 which comprise the fluidized bed 83, after an appropriate exposure to reaction conditions within the reactor 60, are removed from the reactor 60 via a particle output 86 and enter a cooling chamber 98 wherein an inert cooling gas such as He at a lower temperature is introduced via gas inlet 102 thereby cooling the reacted catalytic particles 82. The cooling gas is removed via gas outlet 104. The catalytic particles 82 then leave the cooling chamber 98 via output conduit 100 and enter an oxidation chamber 105. In the oxidation chamber 105, the catalytic particles 82 are exposed to an oxidative gas such as $O_2$ which enters via a gas inlet 106 wherein the amorphous carbon residue on the catalytic particles 82 are removed. Gases are eliminated from the oxidation chamber 105 via gas outlet 107 and the catalytic particles 82 leave via the output conduit 108 and pass through a particle conduit 110 into the catalytic particle treatment unit 96. In the catalytic particle treatment unit 96, the catalyst is separated from the support component of the catalytic particles 82 and 85, and the carbon nanotubes are separated from the catalyst by processes previously discussed. The carbon nanotubes are output via product output 112 for additional purification. The catalyst and support components are transferred via a separation output conduit 114 to a catalyst and support recovery unit 116 wherein the catalyst is recovered, for example, by precipitation, and the support is recovered, for example, by precipitation, and the catalyst and support are reconstituted in a manner previously described to form catalytic particles 82 which can be reused in the process. The catalytic particles 82 thus recovered are transferred via a feeding conduit 118 back into the reducing chamber 64 for reuse, and may be mixed with fresh catalytic particles 82 which enter via a fresh catalytic particle input 120. As previously explained, the gases used in the apparatus 58 of FIG. 4 are preferably recovered and recycled for use within the apparatus 58.

Figure 5:
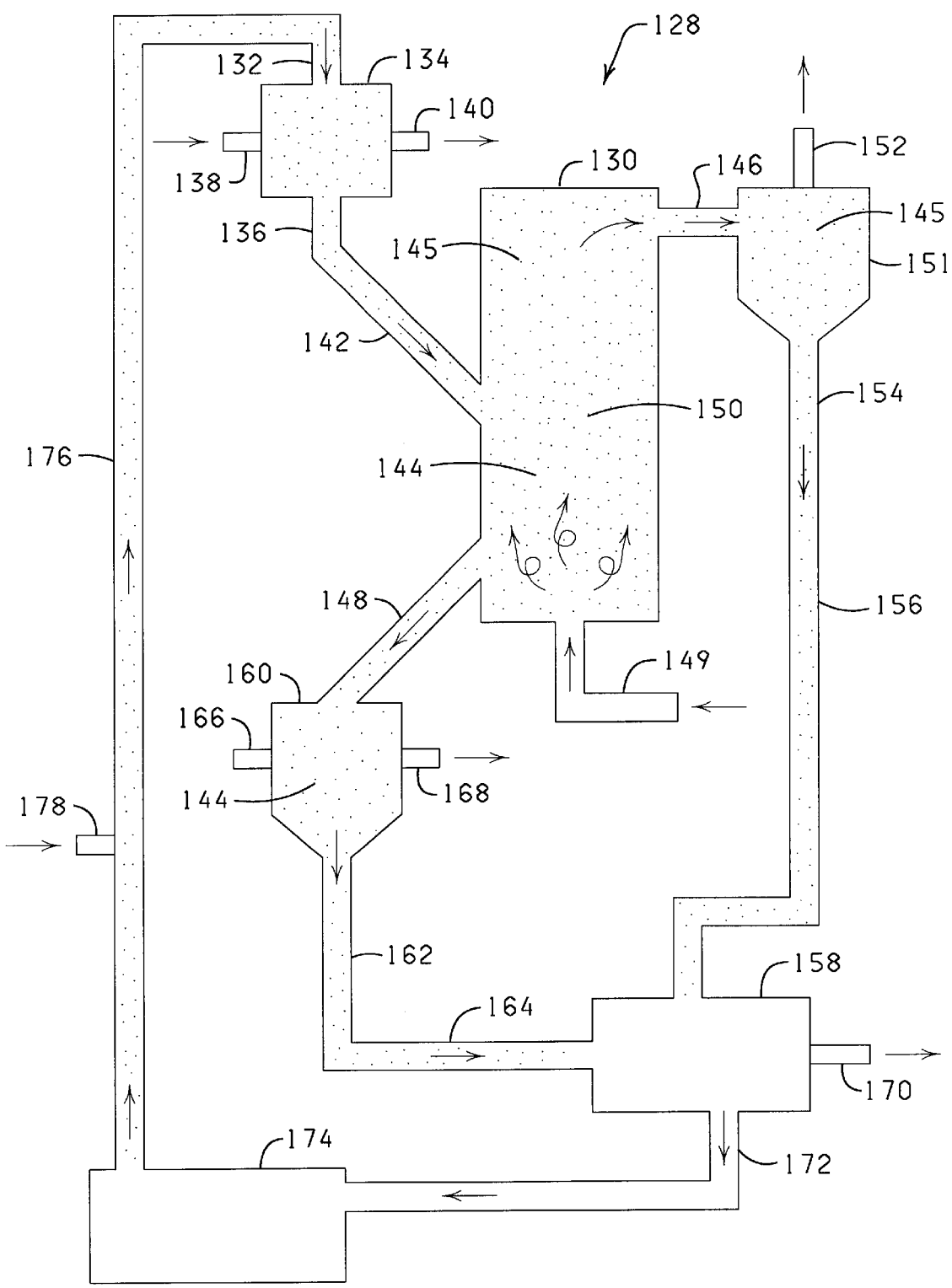
FIG. 5 is a diagrammatic representation of another apparatus which can be used in the method of the present invention

FIG. 5 shows an apparatus 128 which comprises a reactor 130 used as a component in a quasi-continuous batch and fluidized bed process. Portions of the apparatus 128 rely on batch-type processes while portions rely on a fluidized bed-type process, as explained below. Catalytic particles 144 are fed via an input conduit 132 into a reducing/heating chamber 134 wherein the catalytic particles 144 are reduced in a manner similar to that discussed previously but in a batch process rather than in a continuous process. The catalytic particles 144, having been reduced, are then reheated in the same reducing/heating chamber 134 in which they were reduced. The gases used for reducing and heating are introduced via gas inlet 138 and are removed via gas outlet 140. The reducing process thereby alternates with the reheating process. After reheating, the catalytic particles 144 pass out of the reducing/heating chamber 134 via output conduit 136 and pass through a reactor input 142 into the reactor 130 where they are exposed to a carbon-containing gas via gas inlet 149 thereby forming the catalytic particles 144 into a fluidized bed 150 as described previously for the apparatus 58 of FIG. 4, and wherein the carbon nanotube formation process begins. As with the fluidized bed process described above, light catalytic particles 145 may be lofted out of the fluidized bed 150 and carried out with exhaust gas through an exhaust conduit 146 into a light particle trap 151 which filters the light catalytic particles 145 from the exhaust gas which is eliminated via exhaust outlet 152. The light catalytic particles 145 are thereby recovered and passed through a trap output 154 via a light particle conduit 156 into a catalytic particle treatment unit 158 for further processing and recycling of the light catalytic particles 145. Meanwhile the catalytic particles 144 which comprise the fluidized bed 150 after an appropriate exposure to reaction conditions within the reactor 130 are removed from the reactor 130 via a particle output 148 and enter a cooling/oxidizing chamber 160 wherein an inert cooling gas such as He at a lower temperature is introduced via gas inlet 166 thereby cooling the reacted catalytic particles 144. The cooling gas is removed via gas outlet 168. The catalytic particles 144, having been cooled, can now be exposed to an oxidative gas such as $O_2$ via the gas inlet 166 wherein amorphous carbon residues on the catalytic particles 144 are removed. Gases are eliminated from the cooling/oxidizing chamber 160 via gas outlet 168 and the catalytic particles 144, now oxidized leave via an output conduit 162 and pass through a particle conduit 164 into the catalytic particle treatment unit 158. In the catalytic particle treatment unit 158 the catalyst is separated from the support component of the catalytic particles 144 and 145, and the carbon nanotubes are separated from the catalyst by processes previously discussed. The carbon nanotubes are output via product output 170 for additional purification. The catalyst and support components are transferred via a separation output conduit 172 to a catalyst and support recovery unit 174 wherein the catalyst is recovered, for example, by precipitation, and the support is recovered, for example, by precipitation, and the catalyst and support are reconstituted in a manner previously described to form catalytic particles 144 which can be reused in the process. The catalytic particles 144 thus recovered are transferred via a feeding conduit 176 back into the reducing/heating chamber 134 for reuse, and may be mixed with fresh catalytic particles 144 which enter via a fresh catalytic particle input 178. As previously explained, the gases used in the apparatus 128 of FIG. 5 are preferably recovered and recycled for use within the apparatus 128.

Changes may be made in the construction and the operation of the various components, elements and assemblies described herein or in the steps or the sequence of steps of the methods described herein without departing from the spirit and scope of the invention as defined in the following claims.

What is claimed is:

1. A process for producing carbon nanotubes, comprising:
   feeding catalytic particles into a reactor wherein the catalytic particles comprise a support material and a catalyst, the catalyst effective in catalyzing the conversion of a carbon-containing gas into carbon nanotubes;
   removing air from the catalytic particles;
   reducing the catalytic particles by exposing the catalytic particles to reducing conditions forming reduced catalytic particles;
   preheating the reduced catalytic particles to a reaction temperature;
   catalytically forming carbon nanotubes by exposing the reduced catalytic particles to a carbon-containing gas heated to the reaction temperature and under elevated pressure for a duration of time sufficient to cause catalytic production of carbon nanotubes thereby forming reacted catalytic particles bearing the carbon nanotubes;
   flushing the carbon-containing gas from the reacted catalytic particles;

cooling the reacted catalytic particles;

removing amorphous carbon deposited on the reacted catalytic particles by exposing the reacted catalytic particles to oxidizing conditions burning the amorphous carbon and forming semi-purified catalytic particles;

treating the semi-purified catalytic particles to separate the support material from the catalyst;

treating the catalyst to separate the carbon nanotubes from the catalyst;

recovering and recombining the support material and the catalyst to regenerate catalytic particles; and feeding the regenerated catalytic particles into the reactor.

2. The process of claim 1 wherein the process is a continuous flow process.

3. The process of claim 1 wherein the step of removing air further comprises exposing the catalytic particles to a heated inert gas under elevated pressure.

4. The process of claim 1 wherein the step of reducing the catalytic, particles further comprises exposing the catalytic particles to a heated reducing gas under elevated pressure.

5. The process of claim 1 wherein the step of preheating the reduced catalytic particles further comprises exposing the reduced catalytic particles to a heated inert gas under elevated pressure.

6. The process of claim 1 wherein the step of flushing the carbon-containing gas further comprises exposing the reacted catalytic particles to a heated inert gas under elevated pressure.

7. The process of claim 1 wherein the step of cooling the reacted catalytic particles further comprises exposing the reacted particles to a cooling gas under elevated pressure.

8. The process of claim 1 wherein the step of removing the amorphous carbon from the reacted catalytic particles further comprises exposing the reacted catalytic particles to a heated $O_2$-containing gas under elevated pressure.

9. The process of claim 1 wherein the catalyst is a metallic catalyst.

10. The process of claim 9 wherein the step of separating the carbon nanotubes from the metallic catalyst further comprises treating the metallic catalyst with acid or base to dissolve the metallic catalyst thereby yielding the carbon nanotubes.

11. The process of claim 1 wherein the recovering and recombining step is further defined as precipitating the support material and catalyst in separate processing steps then combining the support material and catalyst wherein the support material is impregnated with the catalyst.

12. The process of claim 11 further comprising calcining and pelletizing the support material before or after the support material is impregnated with the catalyst.

13. The process of claim 1 further comprising the step of recycling the carbon-containing gas removed from the reactor after the catalysis step and reusing the carbon-containing gas in the catalysis step.

14. A process for producing carbon nanotubes, comprising:

feeding catalytic particles into a reactor wherein the catalytic particles comprise a support material and a catalyst, the catalyst effective in catalyzing the conversion of a carbon-containing gas into carbon nanotubes;

removing air from the catalytic particles by exposing the catalytic particles to a heated inert gas under elevated pressure;

reducing the catalytic particles by exposing the catalytic particles to a heated reducing gas under elevated pressure forming reduced catalytic particles;

preheating the reduced catalytic particles to a reaction temperature by exposing the reduced catalytic particles to a heated inert gas under elevated pressure;

catalytically forming carbon nanotubes by exposing the reduced catalytic particles to a carbon-containing gas heated to the reaction temperature and under elevated pressure for a duration of time sufficient to cause catalytic production of carbon nanotubes thereby forming reacted catalytic particles bearing the carbon nanotubes;

flushing the carbon-containing gas from the reacted catalytic particles by exposing the reacted catalytic particles to a heated inert gas under elevated pressure;

cooling the reacted catalytic particles by exposing the reacted particles to a moderate temperature inert gas under elevated pressure;

removing amorphous carbon deposited on the reacted catalytic particles by exposing the reacted catalytic particles to a heated $O_2$-containing gas under elevated pressure thereby oxidizing the amorphous carbon and forming semi-purified catalytic particles;

treating the semi-purified catalytic particles to separate the support material from the catalyst;

treating the catalyst with acid thereby dissolving the catalyst to separate the carbon nanotubes from the catalyst;

recovering the support material by precipitation and recovering the catalyst by precipitation;

combining the recovered support material and recovered catalyst, impregnating the catalyst onto the support material, and regenerating the catalytic particles; and feeding the regenerated catalytic particles into the reactor.

15. The process of claim 14 wherein the step of regenerating the catalytic particles further comprises calcining and pelletizing the support material before or after the catalyst is combined with support material.

16. The process of claim 14 further comprising recovering the heated inert gas, the heated reducing gas, the carbon-containing gas, the moderate temperature inert gas, and the heated $O_2$ after their exit from the reactor, purifying each of said gases, and reusing each of said gases in the reactor.

17. The process of claim 14 wherein each gas has a gas flow rate which can be controlled independently of a flow rate of the catalytic particles.

18. The process claim 14 wherein in the step of combining the recovered support material and recovered catalyst, additional support material and/or catalyst is added before regenerating the catalytic particles.

19. The process of claim 14 wherein the inert gas comprises a gas selected from the group consisting of He, Ar, and $N_2$.

20. The process of claim 14 wherein the carbon-containing gas comprises a gas selected from the group consisting of CO, $CH_4$, $C_2H_4$, $C_2H_2$, or mixtures thereof.

21. The process of claim 14 wherein the support material is selected from the group consisting of $SiO_2$, $Al_2O_3$, MgO, $ZrO_2$, zeolites, MCM-41, and Mg(Al)O.

22. The process of claim 14 wherein the catalyst comprises at least one of the metals selected from the group consisting of Co, Mo, Ni, and W.

23. The process of claim 14 wherein the catalyst comprises a Group VIII metal selected from the group consisting of Co, Ni, Ru, Rh, Pd, Ir, Fe, Pt, and mixtures thereof, and a Group VIb metal selected from the group consisting of Cr, Mo, W, and mixtures thereof.

* * * * *